United States Patent
Malmberg et al.

(10) Patent No.: US 11,229,901 B2
(45) Date of Patent: *Jan. 25, 2022

(54) SCR CATALYST DEVICE CONTAINING VANADIUM OXIDE AND MOLECULAR SIEVE CONTAINING IRON

(71) Applicant: UMICORE AG & CO. KG, Hanau-Wolfgang (DE)

(72) Inventors: Stephan Malmberg, Frankfurt (DE); Nicola Soeger, Nidderau (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 200 days.

This patent is subject to a terminal disclaimer.

(21) Appl. No.: 16/469,866

(22) PCT Filed: Dec. 20, 2017

(86) PCT No.: PCT/EP2017/083688
§ 371 (c)(1),
(2) Date: Jun. 14, 2019

(87) PCT Pub. No.: WO2018/115045
PCT Pub. Date: Jun. 28, 2018

(65) Prior Publication Data
US 2019/0314801 A1  Oct. 17, 2019

(30) Foreign Application Priority Data
Dec. 20, 2016 (EP) .................................... 16205232

(51) Int. Cl.
| | |
|---|---|
| *F01N 3/20* | (2006.01) |
| *B01J 35/00* | (2006.01) |
| *B01D 53/94* | (2006.01) |
| *B01J 23/30* | (2006.01) |
| *B01J 29/76* | (2006.01) |
| *B01J 35/04* | (2006.01) |
| *B01J 37/02* | (2006.01) |

(52) U.S. Cl.
CPC ...... *B01J 35/0006* (2013.01); *B01D 53/9418* (2013.01); *B01J 23/30* (2013.01); *B01J 29/7615* (2013.01); *B01J 35/04* (2013.01); *B01J 37/0244* (2013.01); *F01N 3/2066* (2013.01); *B01D 2255/2065* (2013.01); *B01D 2255/20707* (2013.01); *B01D 2255/20723* (2013.01); *B01D 2255/20738* (2013.01); *B01D 2255/20776* (2013.01); *B01D 2255/50* (2013.01); *B01D 2255/9022* (2013.01); *B01D 2255/9032* (2013.01)

(58) Field of Classification Search
None
See application file for complete search history.

(56) References Cited

U.S. PATENT DOCUMENTS

| | | | |
|---|---|---|---|
| 4,961,917 A | 10/1990 | Byrne | |
| 8,080,209 B2 | 12/2011 | Shirono et al. | |
| 8,568,678 B2 | 10/2013 | Soeger et al. | |
| 9,844,768 B2 | 12/2017 | Suenobu et al. | |
| 2008/0112871 A1* | 5/2008 | Obayashi | B01D 53/9418 423/239.1 |
| 2011/0138789 A1* | 6/2011 | Chapman | B01J 23/002 60/302 |
| 2012/0058034 A1 | 3/2012 | Ogunwumi et al. | |
| 2012/0275977 A1 | 11/2012 | Chandler et al. | |
| 2013/0121902 A1* | 5/2013 | Adelmann | B01J 37/0009 423/213.5 |
| 2015/0224486 A1* | 8/2015 | Bauer | B01J 29/68 423/213.5 |
| 2015/0238944 A1 | 8/2015 | Narula et al. | |
| 2016/0136626 A1 | 5/2016 | Phillips | |
| 2016/0367975 A1 | 12/2016 | Lu et al. | |
| 2020/0088080 A1 | 3/2020 | Malmberg et al. | |

FOREIGN PATENT DOCUMENTS

| | | |
|---|---|---|
| CA | 2010970 A1 | 8/1990 |
| CN | 101144409 A | 3/2008 |
| CN | 101396655 * | 4/2009 |
| CN | 101588865 A | 11/2009 |
| CN | 102869431 A | 1/2013 |
| CN | 103260752 A | 8/2013 |
| CN | 103582523 A | 2/2014 |
| CN | 104582845 A | 4/2015 |
| CN | 105026038 A | 11/2015 |
| CN | 105163852 A | 12/2015 |

(Continued)

OTHER PUBLICATIONS

International Preliminary Report on Patentability dated Jun. 25, 2019 for International Patent Application No. PCT/EP2017/083688 (8 pages in German with English translation).

Kim, S. S., et al. Redox Characteristics of $O_2$ and $NO_2$ in the Fast $NH_3$-Selective Catalytic Reduction of NOx Over Vanadium-Based Catalyst. Environmental Engineering Science. 2010. vol. 27, No. 10, pp. 845-852.

Coombs, D. S., et al. Recommended nomenclature for zeolite minerals: report of the subcommittee on zeolites of the International Mineralogical Association, Commission on New Minerals and Mineral Names. Mineralogical Magazine. 1998, vol. 62, No. 4, pp. 533-571.

(Continued)

*Primary Examiner* — Sheng H Davis
(74) *Attorney, Agent, or Firm* — Smith, Gambrell & Russell, LLP

(57) ABSTRACT

The invention relates to a catalyst device for purifying exhaust gases containing nitrogen oxide by means of selective catalytic reduction (SCR), comprising at least two catalytic regions, the first region containing vanadium oxide and cerium oxide, and the second region containing a molecular sieve containing iron. The invention also relates to uses, the catalyst device and methods for purifying exhaust gases.

20 Claims, 1 Drawing Sheet

(56) References Cited

FOREIGN PATENT DOCUMENTS

Figure 1:
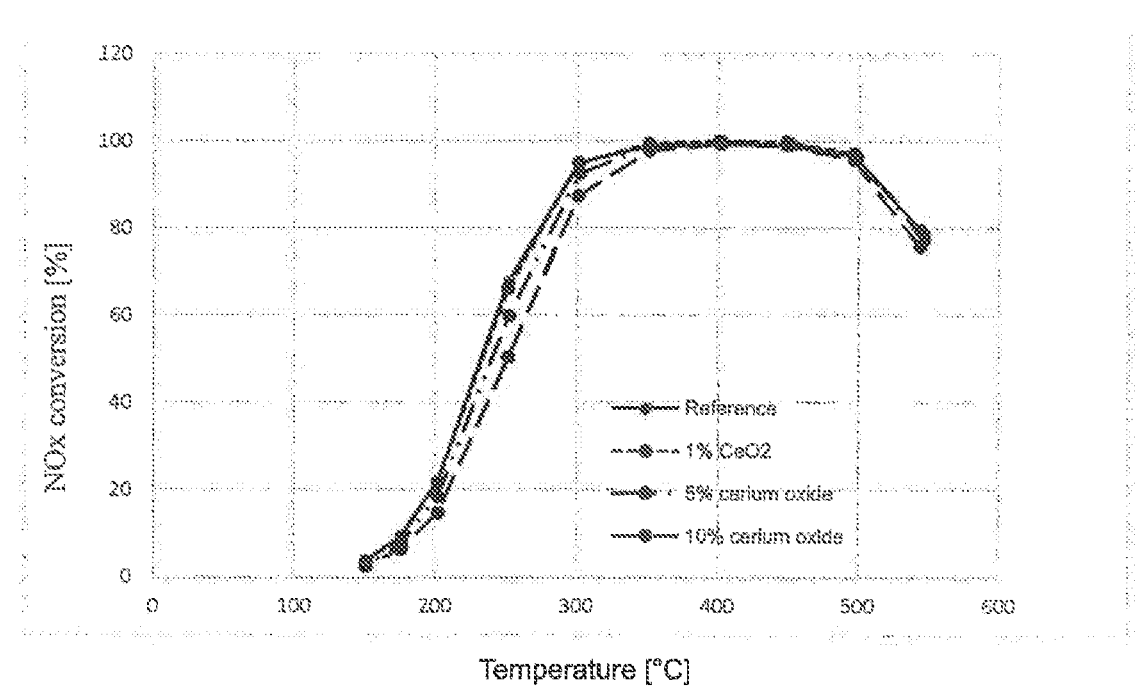

| | | | |
|---|---|---|---|
| DE | 10 2006 031 661 A1 | 1/2008 | |
| DE | 10 2007 003 155 A1 | 7/2008 | |
| DE | 10-2014-002751 A1 | 10/2014 | |
| EP | 0 385 164 B1 | 10/1993 | |
| EP | 2298434 | 3/2011 | |
| EP | 2992956 | * 4/2014 | |
| EP | 2 992 956 | 3/2016 | |
| EP | 2 992 956 A1 | 3/2016 | |
| JP | 2015-182067 A | 10/2015 | |
| WO | 2008/006427 A1 | 1/2008 | |
| WO | 2008/089957 A1 | 7/2008 | |
| WO | 2009/103549 A1 | 8/2009 | |
| WO | 2014/027207 A1 | 2/2014 | |
| WO | 2014178636 | 11/2014 | |
| WO | 2016/011366 A1 | 1/2016 | |
| WO | 2018/115044 A1 | 6/2018 | |

OTHER PUBLICATIONS

International Search Report for PCT/EP2017/083688, dated May 28, 2018 (9pgs. with English translation).

Written Opinion of the International Searching Authority for PCT/EP2017/083688, dated May 28, 2018 (7pgs.).

O. Kröcher, et al. "Combination of $V_2O_5/WO_3$—$TiO_2$, Fe-ZSM5, and Cu-ZSM55 Catalysts for the Selective Catalytic Reduction of Nitric Oxide with Ammonia" Industrial & Engineering Chemistry Research, vol. 47, No. 22, Nov. 19, 2008 (pp. 8588-8593).

L. Chen, et al. "Promotional Effect of Ce-doped $V_2O_5$-$WO_3/TiO_2$ with Low Vanadium Loadings for Selective Catalytic Reduction of $NO_x$ by $NH_3$" Journal of Physical Chemistry C, vol. 113, No. 50, Dec. 17, 2009 (pp. 21177-21184).

Y. Huang, et al. "Low temperature selective catalytic reduction of NO by ammonia over $V_2O_5$—$CeO_2/TiO_2$" Journal of Fuel Chemistry and Technology, vol. 36, No. 5, Oct. 15, 2008 (pp. 616-620).

M. Ziran, et al. "Low-temperature SCR activity and $SO_2$ deactivation mechanism of Ce-modified $V_2O_5$—$WO_3/TiO_2$ catalyst" Progress in Natural Science Materials International, vol. 25, No. 4, Aug. 30, 2015 (pp. 342-352).

X. Wang, et al. "Catalytic performance and hydrothermal durability of $CeO_2$—$V_2O_5$—$ZrO_2/WO_3$—$TiO_2$ based $NG_3$-SCR catalyst" Catalysis Science & Technology, Jun. 13, 2012 (pp. 1386-1395).

K. M. Hyeon, et al. "Effect of Fe-zeolite on formation of $N_2O$ in selective reduction of NO by $NH_3$ over $V_2O_5$—$WO_3/TiO_2$ catalyst" Research on Chemical Intermediates, vol. 42, No. 1, Nov. 4, 2015 (pp. 171-184).

Non Final Office Action dated Feb. 23, 2021 in U.S. Appl. No. 16/469,835 (24 Pages).

Chinese Office Action dated Apr. 27, 2021 in Chinese Patent Application No. 201780078986.6 (11 pages in Chinese with English translation).

Non-Final Office Action dated Jul. 15, 2021 in U.S. Appl. No. 16/469,835 (15 pages).

Chinese Office Action dated May 18, 2021 received in CN Patent Application 201780078987.0 (9 pages in Chinese with English translation).

* cited by examiner

SCR CATALYST DEVICE CONTAINING VANADIUM OXIDE AND MOLECULAR SIEVE CONTAINING IRON

The invention relates to a catalyst device for purifying exhaust gases containing nitrogen oxide by means of selective catalytic reduction (SCR), comprising at least two catalytic regions, the first region containing vanadium oxide and cerium oxide, and the second region containing a molecular sieve containing iron. The invention also relates to uses of the catalyst device and methods for purifying exhaust gases.

PRIOR ART

The method of selective catalytic reduction (SCR) is used in the prior art to reduce nitrogen oxides in exhaust gases, for example from combustion plants, gas turbines, industrial plants or combustion engines. The chemical reaction takes place with selective catalysts, hereinafter referred to as "SCR catalysts," which selectively remove nitrogen oxides, especially NO and $NO_2$, reductively. In contrast, undesired side reactions are suppressed. During the reaction, a reducing agent containing nitrogen is fed in; this is typically ammonia ($NH_3$) or a precursor compound, such as urea, which is added to the exhaust gas. The reaction is a comproportionation. The main reaction products obtained are water and elemental nitrogen. SCR catalysts often contain metal oxides, such as oxides of vanadium, titanium, tungsten, zirconium or combinations thereof. In addition, molecular sieves are often used as SCR catalysts, in particular zeolites exchanged with catalytically active metals.

An important application of SCR is the removal of nitrogen oxides from exhaust gases from combustion engines which are predominantly operated with a lean air/fuel ratio. Such combustion engines are diesel engines and direct injection gasoline engines. These are collectively referred to as "lean-burn engines." In addition to the harmful gases carbon monoxide CO, hydrocarbons HC and nitrogen oxides $NO_x$, the exhaust gas from lean-burn engines contains a relatively high oxygen content of up to 15% by volume. Carbon monoxide and hydrocarbons can easily be rendered harmless by oxidation. The reduction of nitrogen oxides to nitrogen is much more difficult due to the high oxygen content.

Since combustion engines in motor vehicles are operated transiently, the SCR catalyst must guarantee the highest possible nitrogen oxide conversions with good selectivity even under strongly fluctuating operating conditions. A complete and selective nitrogen oxide conversion at low temperatures must be ensured, as must the selective and complete conversion of high nitrogen oxide quantities in very hot exhaust gas, for example during full load driving. In addition, the strongly fluctuating operating conditions cause difficulties with the exact dosing of the ammonia, which should ideally take place in a stoichiometric ratio to the nitrogen oxides to be reduced. This places high demands on the SCR catalyst, i.e. on its ability to reduce nitrogen oxides to nitrogen with high conversion and selectivity rates in a wide temperature window with highly variable catalyst loads and a fluctuating supply of reducing agent.

EP 0 385 164 B1 describes so-called "full catalysts" for the selective reduction of nitrogen oxides with ammonia, which, in addition to titanium oxide and at least one oxide of tungsten, silicon, boron, aluminum, phosphorus, zirconium, barium, yttrium, lanthanum and cerium, contain an additional component selected from the group of oxides of vanadium, niobium, molybdenum, iron and copper.

U.S. Pat. No. 4,961,917 relates to catalyst formulations for the reduction of nitrogen oxides with ammonia, which, in addition to zeolites with a silica:alumina ratio of at least 10 and a pore structure that is linked in all spatial directions by pores with an average kinetic pore diameter of at least 7 angstroms, contain iron and/or copper as promoters.

However, the catalyst devices described in the above documents need to be improved, because good nitrogen oxide conversion rates can only be achieved at relatively high temperatures of above approximately 350° C. or above approximately 450° C. As a rule, optimum conversion only takes place within a relatively narrow temperature range. Such an optimum conversion is typical for SCR catalysts and is determined by the mechanism of action.

The reaction of nitrogen oxides on SCR catalysts with ammonia, which can be formed from a precursor compound such as urea, is carried out according to the following reaction equations:

$$4NO + 4NH_3 + O_2 \rightarrow 4N_2 + 6H_2 \quad (1)$$

$$NO + NO_2 + 2NH_3 \rightarrow 2N_2 + 3H_2O \quad (2)$$

$$6NO_2 + 8NH_3 \rightarrow 7N_2 + 12H_2O \quad (3)$$

It is advantageous to increase the proportion of $NO_2$ and, in particular, to adjust an $NO_2$:NO ratio of approximately 1:1. Under these conditions, significantly higher conversion rates can already be achieved at low temperatures below 200'C, due to the significantly faster reaction (2) ("fast SCR reaction") compared to reaction (1) ("standard SCR reaction").

However, the nitrogen oxides $NO_x$ contained in the exhaust gas from lean-burn engines consist mainly of NO and contain only small proportions of $NO_2$. In the prior art, an upstream oxidation catalyst is therefore used to oxidize NO to $NO_x$.

A further problem with the removal of nitrogen oxides in the exhaust gas of lean-burn engines with SCR catalysts is that the ammonia is oxidized to low-valent nitrogen oxides, especially nitrous oxide ($N_2O$), due to the high oxygen content. This removes the reducing agent required for the SCR reaction from the process on the one hand, and the nitrous oxide escapes as an undesired secondary emission on the other hand.

In order to solve the described conflicts of objectives and to ensure the removal of nitrogen oxides at all operating temperatures, often between 180° C. and 600° C., during driving operation, combinations of various SCR catalysts, which are intended to combine advantageous properties, are proposed in the prior art.

US 2012/0275977 A1 relates to SCR catalysts in the form of molecular sieves. These are zeolites that contain iron or copper. In order to remove nitrogen oxides as comprehensively as possible, various molecular sieves with different functionalities are preferably combined.

US 2012/0058034 A1 proposes the combining of zeolites with another SCR catalyst based on oxides of tungsten, vanadium, cerium, lanthanum and zirconium. The zeolites are mixed with the metal oxides and coated on a suitable substrate, whereby a single catalyst layer with both functionalities is obtained.

In the prior art, vanadium-based SCR catalysts were also combined with iron-exchanged zeolites. For example, WO 2014/027207 A1 discloses SCR catalysts containing, as a first catalytic component, an iron-exchanged molecular sieve and, as a second component, a vanadium oxide coated on a metal oxide selected from aluminum, titanium, zirconium, cerium or silicon. The various catalysts are mixed and a single catalytic coating is produced on a suitable substrate. However, the efficiency of such a catalyst in the temperature range below 450° C. and especially below 350° C. is still in need of improvement.

WO 2009/103549 discloses combinations of zeolites and vanadium oxide in combination with other metal oxides. In order to improve catalyst efficiency, dividing the catalyst into zones is proposed. A zone with the zeolite, which serves as an $NH_3$ storage component, is located on the exhaust gas inlet side. A zone with the SCR-active component, which contains the vanadium-based SCR catalyst, is then attached to the outlet side. The zeolite has only one storage function, while the following component catalyzes the SCR reaction with a vanadium oxide.

WO 2008/006427 A1 relates to combinations of iron-exchanged zeolites with copper-exchanged zeolites. It specifically proposes the coating of a ceramic substrate first with the copper-exchanged zeolite, and forming a coating with the iron-exchanged zeolite over it. In this way, the different activities of the layers in different temperature ranges are to be combined in an advantageous manner.

WO 2008/089957 A1 proposes providing a ceramic substrate with a lower coating containing vanadium oxide and an upper coating containing iron-exchanged zeolites. The upper coating with the iron-exchanged zeolite is intended to prevent nitrous oxide from being formed at high operating temperatures.

EP 2 992 956 A1 describes an SCR catalyst with a "two-layer structure" in which a layer containing $V_2O_5/TiO_2$ lies on a layer comprising a metal-exchanged zeolite.

SCR catalysts comprising vanadium-based formulations and Cu or Fe zeolites are also disclosed in WO 2016/011366 A1, DE 10 2006 031 661 A1 and in Ind. Eng. Chem. Res. 2008, 47, 8588-8593.

However, the efficiency of the described SCR catalysts is still in need of improvement. There is a continuous need for catalysts that are highly efficient under various application conditions. In particular, there is a need for catalysts that are suitable for the purification of both NO-rich and $NO_2$-rich exhaust gases and that are highly efficient over the entire temperature range of common applications, that is, at low and medium temperatures as well.

A further problem with conventional catalysts is that nitrous oxide is formed in conventional combustion engine applications. This problem is particularly evident in the medium and low temperature range below approximately 450° C. or below approximately 350° C. Exhaust gases from combustion engines often have such temperatures during normal operation, which can lead to the undesired formation and release of nitrous oxide.

In J. Phys. Chem. C2009, 113, 2, 1177-21184, it is reported that the conversion of nitrogen monoxide (NO) with ammonia on $V_2O_5$—$WO_3/TiO_2$ SCR catalysts can be improved by adding cerium oxide to the mentioned SCR catalysts. However, the measurements were carried out with SCR catalysts that contained only 0.1% vanadium by weight and are therefore irrelevant in practice. The same applies to the data reported in Progress in Natural Science Materials International, 25 (2015), 342-352. The documents do not contain data regarding the conversion of nitrogen dioxide ($NO_2$).

J. Fuel. Chem. Technol., 2008, 36(5), 616-620, also includes data regarding the influence of the content of cerium oxide on $V_2O_5$—$CeO_2/TiO_2$ SCR catalysts during the conversion of nitrogen monoxide (NO) with ammonia. Accordingly, positive effects of cerium oxide are only observed at contents of 20% by weight and higher. The document does not contain data regarding the conversion of nitrogen dioxide ($NO_2$).

Figure 2:
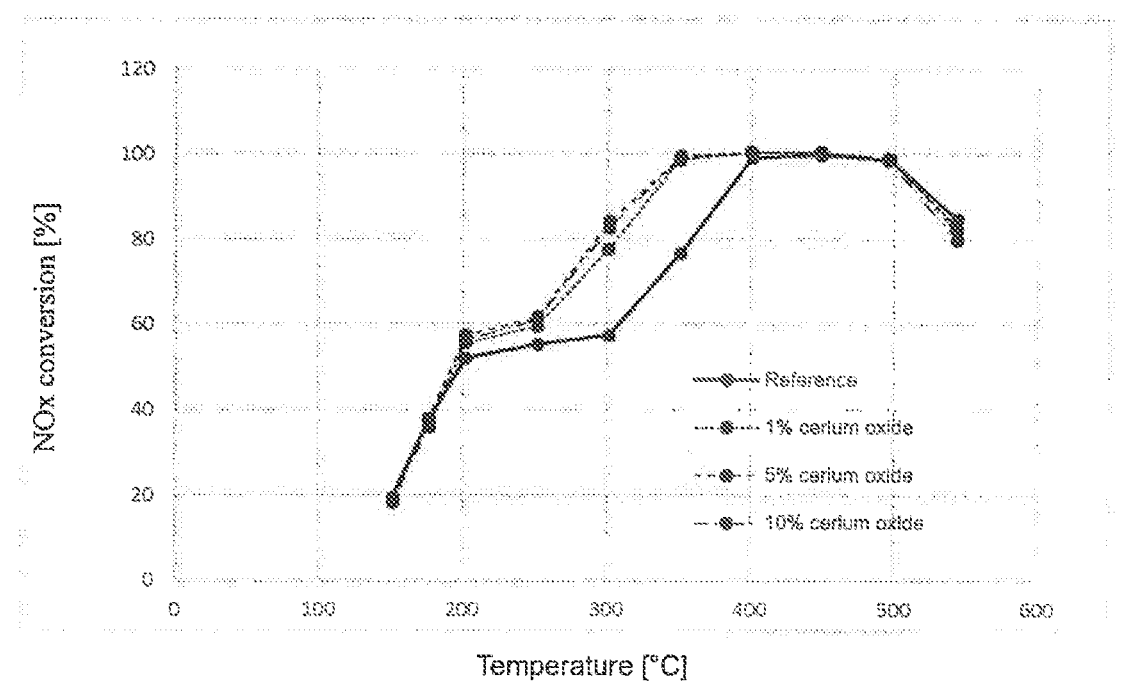

It is known that the $NO_x$ conversion with ammonia in the presence of $V/TiO_2$ SCR catalysts strongly depends on the $NO_2/NO_x$ molar ratio; see for example Environmental Engineering Science, Vol. 27, 10, 2010, 845-852, especially FIG. 2. Thus, results of the conversion of NO cannot be used to predict results of the conversion of $NO_2$ or of $NO_x$ with a high $NO_2$ proportion.

The investigations of the inventors of this application show that the conversion of nitrogen oxides with ammonia at low temperatures on SCR catalysts containing vanadium and cerium depends in particular on the composition of the nitrogen oxide. In the case that the nitrogen oxide consists only of nitrogen monoxide (NO), the conversion decreases with increasing cerium oxide content. However, this changes with increasing nitrogen dioxide ($NO_2$) content. Thus, for example, the conversion at a content of nitrogen dioxide of 75% increases with an increasing proportion of cerium oxide; see FIGS. 1 and 2.

OBJECT OF THE INVENTION

The invention is based on the object of providing catalysts, methods and uses that overcome the disadvantages described above. In particular, SCR catalysts that enable efficient removal of nitrogen oxides over a wide temperature range, including low and medium temperatures, are to be provided. The aim is to efficiently remove nitrogen oxides $NO_x$, especially NO and $NO_2$, while at the same time avoiding the formation of nitrous oxide $N_2O$. The catalysts are to be highly efficient, especially in the temperature range from 180° C. to 600° C., which is typically important for combustion engines.

The catalysts are to be particularly suitable for the purification of exhaust gases with a relatively high $NO_2$ proportion, especially if the ratio of $NO_2$:NO is ≥1:1. The catalysts are also to be efficient at low temperatures, where prior art catalysts are often less efficient, for example at <450° C. or <350° C.

In particular, catalysts that combine the following advantageous properties are to be provided:
a high degree of efficiency with $NO_2$-rich exhaust gases in the temperature range of approximately 180° C. to 600° C., especially at low temperatures and with the avoidance of the formation of nitrous oxide.

The catalysts are to preferably be effective both immediately after manufacture and after a longer period of use and aging.

DISCLOSURE OF THE INVENTION

Surprisingly, the underlying object of the invention is achieved by catalyst devices, uses and methods according to the claims.

The object of the invention is a catalyst device for purifying exhaust gases containing nitrogen oxide by means of selective catalytic reduction (SCR), comprising at least two catalytic regions, the first region containing vanadium oxide and cerium oxide, and the second region containing a molecular sieve containing iron.

The catalyst device is used for the reduction of nitrogen oxides ("$NO_x$") in exhaust gases by means of the selective catalytic reduction (SCR) process. The exhaust gases can come from combustion engines, combustion plants, gas turbines or industrial plants, for example. During the SCR, nitrogen oxides, especially NO and $NO_2$, are selectively reduced. The reaction takes place in the presence of a reducing agent containing nitrogen, usually ammonia ($NH_3$) or a precursor compound thereof, such as urea. The reducing agent containing nitrogen is typically added to the exhaust gas.

The catalyst contains at least two catalytic regions. "Catalytic" means that each of the regions has catalytic activity during the SCR. The first catalytic region is abbreviated in the following as "vanadium cerium catalyst."

Within the scope of this application, the term "metal oxide" generally refers to oxides of the metal. The term does not only refer to the metal monoxide with a stoichiometric ratio of 1:1. The term "metal oxide" refers to both specific oxides and mixtures of various oxides of the metal.

The first region contains vanadium oxide, which is preferably present as vanadium pentoxide $V_2O_5$. It cannot be ruled out that a portion of the vanadium has a different oxidation state and is present in a different form. Vanadium oxide is preferably the essential catalytically active component of the first region, which is mainly responsible for the reaction.

The first region additionally contains cerium oxide. The cerium oxide can be present in a defined oxidation state or as a mixture of various oxidation states. In one embodiment, the cerium oxide is present in its entirety or in part as $CeO_2$. Surprisingly, it has been found that, by combining vanadium oxide with cerium oxide in a catalyst device, which also has a catalytic region with a molecular sieve containing iron, the efficiency of the SCR can be significantly improved. By combining such catalysts and components, a very good $NO_x$ removal from exhaust gases with a high NO proportion or a high $NO_2$ proportion is achieved, and the formation of $N_2O$ is significantly suppressed. Such advantageous effects are particularly evident with $NO_2$-rich exhaust gases, and in a temperature range below 450° C., and especially in the range from 180 to 450° C., where the efficiency of conventional catalysts is particularly in need of improvement, and the undesired formation of nitrous oxide is a particularly relevant problem.

Such advantages by adding cerium oxide can be particularly pronounced after the catalyst is aged. It has been found that, after aging of the catalyst, both the removal of nitrogen oxides and the prevention of the formation of $N_2O$ are particularly effective if a vanadium catalyst additionally contains cerium oxide. This is an advantage as such catalysts have to have a long service life in common applications, especially for purifying exhaust gases from combustion engines, and are exposed to strongly changing external conditions (temperature, humidity, exhaust gas composition), which favor such aging processes.

In a preferred embodiment, the first region contains at least one other component selected from oxides of tungsten, titanium, silicon and aluminum. It is preferred that the first region additionally contains at least one, preferably at least two, metal oxides selected from $TiO_2$, $SiO_2$, $WO_3$ and $Al_2O_3$. Particularly preferably, the first region contains oxides of vanadium, cerium, tungsten and titanium, wherein the oxides of vanadium, tungsten and titanium are preferably present as $V_2O_5$, $WO_3$ and $TiO_2$.

The metal oxides may exhibit catalytic activity during the SCR or contribute to catalytic activity. According to the invention, vanadium oxide, cerium oxide and tungsten oxide, for example, exhibit catalytic activity.

The metal oxides may also have no or only low catalytic activity and may serve as the substrate material, for example. Such non-catalytic components are used, for example, to enlarge the inner surface and/or to create a porous structure. Titanium oxide, for example, is the preferred substrate material. It may contain proportions of other non-reactive or only slightly reactive metal oxides, such as silicon dioxide or aluminum trioxide. The substrate material is generally present in excess, with the catalytic component generally being applied to the surface of the inert component.

In a preferred embodiment, the main component of the first region is titanium dioxide, which, for example, constitutes more than 50% by weight, more than 80% by weight or more than 90% by weight of the region. For example, a catalyst based on oxides of vanadium, cerium, titanium and tungsten essentially contains $TiO_2$ in the anatase modification. In this case, $TiO_2$ can be stabilized by $WO_3$ in order to achieve an improvement in thermal stability. The proportion of $WO_3$ is typically 5 to 15% by weight, for example 7 to 13% by weight.

An advantage of the catalytic components based on vanadium oxide and cerium oxide is high SCR activity at low temperatures. According to the invention, the low-temperature activity of vanadium-based catalysts is advantageously combined with the specific activity of iron-containing zeolites to provide a catalyst with excellent cold start properties.

The first region preferably contains vanadium oxide, calculated as $V_2O_5$ and based on the weight of the first region, from 0.5 to 10% by weight, in particular from 1 to 5% by weight. The first region preferably contains cerium oxide, calculated as $CeO_2$ and based on the weight of the first region, from 0.2 to 10% by weight, in particular from 0.5 to 7% by weight, from 0.5 to 5% by weight or from 0.5 to 3% by weight. The catalyst preferably contains tungsten oxide, calculated as $WO_3$ and based on the weight of the first region, from 1 to 17% by weight, especially from 2 to 10% by weight. The term "calculated as" takes into account that, in the technical field, elemental analysis generally determines the quantities of metals.

In a preferred embodiment, the first region preferably contains or consists of the following oxides of metals:
  (a) from 0.5 to 10% by weight vanadium oxide, calculated as $V_2O_5$.
  (b) from 0.2 to 10% by weight cerium oxide, calculated as $CeO_2$,
  (c) from 0 to 17% by weight tungsten oxide, calculated as $WO_3$,
  (d) from 25 to 98% by weight titanium oxide, calculated as $TiO_2$,
  (e) from 0 to 15% by weight silicon oxide, calculated as $SiO_2$,
  (f) from 0 to 15% by weight aluminum oxide, calculated as $Al_2O_3$,
in each case based on the weight of the first region.

The first region particularly preferably contains 0.5 to 10% by weight vanadium oxide; 0.5 to 7% by weight cerium oxide; 2 to 17% by weight tungsten oxide, and 25 to 98% by weight titanium dioxide, based on the weight of the first region.

Particularly preferably, the first region contains or consists of the following oxides of metals:
  (a) from 1 to 5% by weight vanadium oxide, calculated as $V_2O_5$,
  (b) from 1 to 15% by weight tungsten oxide, calculated as $WO_3$, (c) from 0.5 to 5% by weight cerium oxide, calculated as $CeO_2$,
(d) from 73 to 98% by weight titanium dioxide, and
(e) from 0 to 25% by weight silicon dioxide, wherein the sum of the proportions of cerium oxide+tungsten oxide is <17% by weight, in each case based on the weight of the first region.

The catalyst includes a second catalytic region containing a molecular sieve containing iron.

The term "molecular sieve" refers to natural and synthetic compounds, in particular zeolites, which have a strong adsorption capacity for gases, vapors and dissolved substances with certain molecular sizes. Through a suitable selection of the molecular sieve, it is possible to separate molecules of different sizes. In addition to zeolites, aluminum phosphates, in particular silicon aluminum phosphates, are also known. Molecular sieves generally have uniform pore diameters of the order of magnitude of molecular diameters and a large inner surface area (600-700 $m^2/g$).

In a particularly preferred embodiment, the molecular sieve is a zeolite. The term "zeolite" is generally understood to mean a crystalline substance from the group of aluminum silicates with a spatial network structure of the general formula $M^{n+}[(AlO_2)X(SiO_2)Y]xH_2O$ as defined by the International Mineralogical Association (D. S. Coombs et al., Can. Mineralogist, 35, 1997, 1571). The basic structure is formed from $SiO_4/AlO_4$ tetrahedra, which are linked by common oxygen atoms to form a regular three-dimensional network.

The zeolite structure contains cavities and channels that are characteristic of each zeolite. Zeolites are divided into different structures according to their topology. The zeolite framework contains open cavities in the form of channels and cages that are normally occupied by water molecules and special framework cations that can be exchanged.

The entrances to the cavities are formed by 8, 10 or 12 "rings" (narrow-pored, medium-pored and wide-pored zeolites). In a preferred embodiment, the zeolite has a structure whose maximum ring size is defined by more than 8 tetrahedra.

According to the invention, zeolites with the topologies AEL, AFI, AFO, AFR, ATO, BEA, GME, HEU, MFI, MWW, EUO, FAU, FER, LTL, MAZ, MOR, MEL, MTW, OFF and TON are preferred. Zeolites of the topologies FAU, MOR, BEA, MFI and MEL are particularly preferred.

A zeolite, in particular any 10-ring and 12-ring zeolite with a $SiO_2/Al_2O_3$ molar ratio (molar ratio, SAR ratio) of 5:1 to 150:1 is preferred within the scope of the present invention. The preferred $SiO_2/Al_2O_3$ module according to the invention is in the range from 5:1 to 50:1, and particularly preferably in the range from 10:1 to 30:1.

The molecular sieve in the second region contains iron and is preferably an iron-containing zeolite. It has been found that iron-containing zeolites in combination with the first region containing vanadium oxide and cerium oxide catalyze a particularly efficient SCR. Preferably, a zeolite that is exchanged with iron ions ("zeolite exchanged with iron"), or with which at least some of the aluminum atoms of the ferrosilicate skeleton are isomorphically substituted with iron, is used.

Particularly preferably, the zeolite is exchanged with iron. The zeolite is preferably of the BEA type. A zeolite of the BEA type with a SAR ratio of 5:1 to 50:1 exchanged with iron is particularly preferred. Manufacturing processes for iron-containing zeolites, for example via solid or liquid phase exchange, are known to the person skilled in the art. The proportion of iron in the iron-containing zeolite is, for example, up to 10% or up to 15%, calculated as $Fe_2O_3$ and based on the total amount of iron-containing zeolite. Iron-containing and iron-exchanged zeolites that are preferred according to the invention are described, for example, in US 2012/0275977A1.

In a preferred embodiment, the second region contains at least two different iron-containing zeolites. The advantage here is that various desired properties can be combined. For example, an iron-containing zeolite that is active at low temperatures can be combined with an iron-containing zeolite that is active at higher temperatures.

The second region may contain other components in addition to the iron-containing zeolite, in particular non-catalytically active components, such as binders. For example, metal oxides with little or no catalytic activity, such as $SiO_2$, $Al_2O_3$ and $ZrO_2$, are suitable as binders. The proportion of such binders in the second region is, for example, up to 15% by weight.

In a preferred embodiment, the catalyst device has a substrate in addition to the first and second catalytic regions. The substrate is a device to which the catalytic regions, usually through coating, are applied. The substrate is not catalytically active; that is, it is inert for the reaction. The substrate can be a metallic or ceramic substrate. The substrate may have a honeycomb structure of parallel exhaust gas channels or be a foam. In a preferred embodiment, the substrate is a monolith. Monoliths are one-piece ceramic substrates used in particular in the automotive industry and having parallel channels from the inlet to the outlet side, through which channels the exhaust gases flow. The structure is also designated as a honeycomb shape. Alternatively, the substrate may be a filter with which the exhaust gases flow on the inlet side into channels closed on the outlet side, diffuse through the channel walls and leave the substrate through channels closed on the inlet side and open on the outlet side.

In an additional embodiment of the invention, a catalytic region simultaneously serves as the substrate. This is particularly possible if the first or second catalytic region is provided as an extrudate. In this case, the extruded region itself forms the substrate device to which the other region is applied through coating. Such a substrate device is available, for example, if the iron-containing zeolite is incorporated into the walls of the exhaust gas channels. This embodiment has the advantage that no additional inert substrate is required so that the interior of the catalyst device can be designed to be particularly compact.

The catalyst device according to the invention contains at least a "first" and a "second" region with different catalyst activities. The catalyst device according to the invention may have exactly one first region and one second region, but also more than one first and second region, for example 2, 3 or 4 first and/or second regions. The terms "first region" (with a vanadium oxide and a cerium oxide) and "second region" (with a molecular sieve containing iron) are used within the scope of this application only to distinguish between them. They do not include any statement regarding the spatial arrangement of the regions. Consequently, they do not mean that the first region is located in front of the second region.

The first region containing vanadium oxide and cerium oxide and the second region containing a molecular sieve containing iron are spatially separated. The regions can be consecutive zones in the direction of flow of the exhaust gas. Alternatively, the regions can exist as superimposed layers so that, for example, the second region forms a lower layer and the first region forms a layer above it.

In a preferred embodiment, the entire interior of the catalyst device according to the invention is coated with the first and/or second region. Preferably, the entire interior is completely coated with the first and second region. With this embodiment, a particularly efficient conversion of nitrogen oxides is achieved, because the entire inner surface of the device is used catalytically.

The size and thickness of the first and second regions and the amount of catalysts in the first and second regions are adjusted to each other in such a manner that a desired depletion of nitrogen oxides is achieved.

It has generally been found that selective catalytic reduction (SCR) is advantageous if two catalytic regions, the first region containing vanadium oxide and cerium oxide and the second region containing a molecular sieve containing iron, are combined in a catalyst device according to the invention. This combination of catalysts allows nitrogen oxides $NO_x$ to be efficiently removed under various conditions, while at the same time suppressing the formation of nitrous oxide.

In a particularly preferred embodiment, the catalyst device is designed in such a manner that the exhaust gases initially contact the first region containing the vanadium cerium catalyst. Without being bound to any theory, it is assumed that an exhaust gas fraction reacting with the vanadium cerium catalyst then reacts advantageously with the iron-containing zeolite so that a particularly efficient depletion of nitrogen oxides is achieved, while at the same time avoiding the formation of nitrous oxide. The arrangement of the catalysts in this order can also lead to a particularly efficient purification of $NO_2$, even at relatively low temperatures, while at the same time avoiding the formation of nitrous oxide.

In an additional preferred embodiment, the catalyst device is designed in such a manner that the exhaust gases initially contact the second region containing the molecular sieve containing iron.

In a preferred embodiment, the first and second regions are arranged one after the other in the direction of flow of the exhaust gas. Such adjacent regions are referred to as "zones" within the scope of this application. The first region can be a first zone and the second region can be a second zone, or vice versa. The exhaust gases passing through the catalyst device in the direction of flow contact the different zones one after the other. The catalyst device in a preferred embodiment can have exactly one first and one second zone. Alternatively, the catalyst device may have a plurality of successive zones, such as 2, 3 or 4. The length of the zones is selected according to thickness and desired catalytic efficiency. For example, a zone can amount to between 20 and 80%, or between 30 and 70%, of the length of the device. In particular, the zones may have the same lengths.

In a particularly preferred embodiment, the first region is a first zone and the second region is a second zone, with the first zone upstream of the second zone in the direction of flow of the exhaust gas. Thus, the first zone that the exhaust gases initially contact contains the vanadium cerium catalyst. The first zone is arranged on the inlet side. The second region with the molecular sieve containing iron forms the second zone, which lies downstream in the direction of flow and on the outlet side. It has been found that a catalyst device with such a spatial design catalyzes the SCR particularly efficiently and almost completely suppresses the formation of nitrous oxide.

In a particularly preferred embodiment, the first region is a first zone and the second region is a second zone, with the second zone upstream of the first zone in the direction of flow of the exhaust gas. Thus, the first zone that initially contacts the exhaust gases contains the molecular sieve containing iron. The second zone is arranged on the inlet side. The first region with the vanadium cerium catalyst forms the second zone, which lies downstream in the direction of flow and on the outlet side. Moreover, a catalyst device with such a spatial design particularly efficiently catalyzes the SCR and reduces the formation of nitrous oxide.

In a preferred embodiment, the first and second region form superimposed layers. In this case, the first region with the vanadium cerium catalyst particularly preferably forms the upper layer. It has been found that such a catalyst device has, among other things, advantages after aging, which may indicate a high resistance and durability. In an additional preferred embodiment, the second region forms the upper layer so that the first region is below it.

In a preferred embodiment, the second region containing the molecular sieve containing iron is completely applied to the substrate as the lower layer. The first region, which contains the vanadium cerium catalyst, can be formed completely in the form of a first layer or only in zones on the second layer.

In a preferred embodiment, the first region is completely applied as an upper layer on the second region as a lower layer. This means that no region in which the lower, second region containing the molecular sieve containing iron directly contacts the exhaust gases exists on the inner surface of the catalyst device. It is advantageous that only exhaust gases which have been pre-treated in the upper layer containing the vanadium cerium catalyst reach the lower layer.

In an additional preferred embodiment, the first region is not continuous as the upper layer but is applied in zones on the second region as the lower layer. With this design, there are partial regions in which the lower layer, which contains the molecular sieve containing iron, comes into direct contact with the exhaust gases. In this case, it is preferred that the exhaust gases first come into contact with the upper layer containing the vanadium cerium catalyst. It is therefore particularly preferred that a region with an upper layer is present first in the direction of flow. it is also achieved in this embodiment that the exhaust gases first come into contact with the upper layer, which contains the vanadium cerium catalyst, and are thereby pre-treated before they reach the second layer.

In one embodiment, the exhaust gases last contact the first region containing the vanadium cerium catalyst when leaving the catalyst device. Thus, a reaction with the vanadium oxide takes place last. A lower layer with the molecular sieve containing iron is preferably present at the outlet of the catalyst device below the upper layer.

In an additional preferred embodiment, the first region and/or the second region consist of two or more superimposed sublayers. The sublayers may differ, for example, in physical properties, such as density or porosity, or chemical properties, such as the composition of the individual components.

In a preferred embodiment, the catalyst device does not contain any additional layers. Therefore, at each place of the device, the exhaust gases directly contact the first or the second region. Particularly preferably, the first region containing the vanadium cerium catalyst contacts the exhaust gases directly in the device. In this case, the first region forms an outer layer over which no further layer is applied.

According to the invention, it is also possible that at least one additional functional region is provided, which serves, for example, to pre-treat or post-treat the exhaust gases. The pre-treatment or post-treatment can be, for example, a catalytic pre-treatment. In a preferred embodiment, the catalyst device comprises at least one further third region comprising a vanadium oxide catalyst without cerium oxide. The third region can be selected as described above for the first region, with the difference that no cerium oxide is present. For example, a zone may thus consist of a sublayer containing a vanadium oxide without cerium oxide and a sublayer containing a vanadium oxide with cerium oxide. In addition to the first, second and third region, no other different regions are preferably provided in this case.

The second region may consist, for example, of a first and a second sublayer containing molecular sieves containing iron and having different activities. It is generally advantageous in the case of such embodiments with sublayers that through suitable selection and combinations of different catalysts of the same type, their properties can be specifically combined in order, to, for example achieve reactivity in a wide temperature range.

In a preferred embodiment, the catalyst device has no regions, in particular no catalytic regions, other than the first and second region.

The catalyst device preferably does not contain any precious metal. In particular, the first and second region do not contain precious metals, such as platinum, gold, palladium and/or silver. According to the invention, a highly efficient catalyst device is provided without the need to use expensive precious metals that are not available in large quantities.

The SCR catalyst is applied using prior art methods, for example by applying coating suspensions (so-called "wash coats"), by coating in an immersion bath or by spray coating. A region can also be an extrudate. Particularly preferably, the application of the regions is as coatings with wash coats. As is common practice, wash coats are coating suspensions in which the solids or precursor compounds are suspended and/or dissolved to produce the catalytic regions. Such wash coats are provided in very homogeneous form with finely distributed ingredients so that the substrates can be coated as uniformly as possible. After applying the wash coats, the usual post-treatment steps, such as drying, calcining and tempering, follow.

In a preferred embodiment, the ratio of the weight (per catalyst volume) of the first region to the second region in the catalyst device is greater than 0.2, in particular between 0.2 and 15, and particularly preferably between 1 and 6.

In another preferred embodiment, the first region is a zone extending from the first end of the substrate over 20% to 80% of its total length. In this case, the second region is a zone extending from the second end of the substrate over 20% to 80% of its total length.

The total number of regions is selected so as to use the device as efficiently as possible overall. In the case of a flow-through substrate, for example, the total amount of coatings (proportion of solids) per substrate volume (total volume of the catalyst device) may be between 100 and 600 g/l, in particular between 100 and 500 g/l. Preferably, the second, lower layer is used in a quantity of 50 to 200 g/l, in particular between 50 and 150 g/l, particularly preferably of approximately 100 g/l. The first, upper layer is preferably used in a quantity of 100 to 400 g/l, in particular between 200 and 350 g/l, particularly preferably of approximately 280 g/l. In the case of a filter substrate, considerably less wash coat is generally used, for example in a total quantity of 10 to 150 g/l.

The object of the invention is also the use of a catalyst device according to the invention for the purification of exhaust gases containing nitrogen oxide by means of selective catalytic reduction (SCR).

The subject matter of the present invention is also a method for removing nitrogen oxides from the exhaust gas of combustion engines operated with lean air fuel, characterized in that the exhaust gas is passed through a catalyst device in accordance with the invention.

The method according to the invention is particularly advantageous if the $NO_2$ proportion in the nitrogen oxide exceeds 50% ($NO_2/NO_x>0.5$), thus is for example 75%.

The exhaust gases are preferably those from combustion plants. The combustion plants can be mobile or stationary. Mobile combustion devices within the meaning of this invention are, for example, combustion engines of motor vehicles, especially diesel engines. Stationary combustion devices are usually power plants, combustion plants or heating systems for private households. Preferably, the exhaust gases originate from lean-burn engines; that is, combustion engines operated predominantly with a lean air/fuel ratio. Lean engines are in particular diesel engines and direct injection gasoline engines.

The invention also relates to a system or a device comprising a catalyst device according to the invention and an upstream device that releases exhaust gases, in particular a combustion engine. The system may include other devices, such as exhaust gas lines or other catalyst devices. The invention also relates to an automobile containing the exhaust gas device or the system according to the invention.

Depending on various influencing factors (for example, engine calibration, operating condition, type and design of upstream catalysts), the $NO_2$ proportion in the $NO_x$ may exceed 50%. In accordance with the invention, it has been found that the catalyst device particularly efficiently catalyzes the SCR of exhaust gases with high $NO_2$ contents ($NO_2/NO_x>0.5$), even in the problematic medium to low temperature range below approximately 450° C., in particular below 350° C. In particular, it has been found that in the case of such exhaust gases, an efficient removal of nitrogen oxides is achieved while at the same time avoiding the formation of nitrous oxide. These results were surprising, as it was known in the prior art that vanadium catalysts are relatively inefficient in the SCR with $NO_2$-rich exhaust gases, especially at low temperatures, while the more efficient iron zeolite catalysts produce a high $N_2O$ proportion.

In a preferred embodiment, the exhaust gases originate from an upstream oxidation catalyst. Such upstream oxidation catalysts are used in the prior art to increase the proportion of $NO_2$ in exhaust gases from lean-burn engines, in particular diesel engines.

When introduced into the catalyst device, the exhaust gases preferably have a relatively high oxygen content of, for example, at least 5% by vol., at least 10% by vol. or at least 15% by vol. Exhaust gases from lean-burn engines regularly have such high oxygen contents. The oxidizing agent oxygen makes the reductive removal of nitrogen oxides by means of SCR more difficult. Surprisingly, it has been found that the catalyst devices according to the invention also efficiently remove nitrogen oxides from exhaust gases with a high oxygen proportion and at the same time prevent the formation of nitrous oxide.

Preferably, during the SCR reaction of exhaust gases with the catalyst device according to the invention, more than 90%, preferably more than 95%, of $NO_x$ and/or $NO_2$ are removed.

According to the invention, it is advantageous that efficient purification of exhaust gases by means of SCR can also take place at relatively low temperatures, wherein the formation of nitrous oxide can be avoided precisely at low temperatures. The use of the catalyst device is particularly advantageous at temperatures in the range of below 450° C., in particular from 180 to 450° C., and particularly preferably between 200 and 350° C.

In a preferred embodiment, use takes place to prevent the formation of nitrous oxide ($N_2O$), especially in the purification of $NO_2$-rich exhaust gases and especially at temperatures below 450° C. or below 350° C. According to the invention, it has been found that efficient depletion of nitrogen oxides can take place while at the same time the formation of nitrous oxide is avoided, or relatively little nitrous oxide is produced. According to the prior art, the SCR reaction with vanadium catalysts and iron-containing zeolites produces relatively high amounts of nitrous oxide, especially when purifying $NO_2$-rich exhaust gases at low or medium temperatures. It was therefore surprising that an efficient SCR is carried out with a vanadium catalyst that also contains a cerium oxide, and that at the same time only relatively small amounts of nitrous oxide are produced. Preferably, the concentration of nitrous oxide after the SCR with the catalyst device according to the invention is not higher than 50 ppm, 20 ppm or 10 ppm. In particular, such concentrations shall not be exceeded at temperatures in the range of 180° to 450° C., in particular 200° C. to 350° C.

The object of the invention is also a method for purifying exhaust gases, comprising the following steps:
 (i) Providing a catalyst device according to the invention,
 (ii) Introducing exhaust gases containing nitrogen oxides into the catalyst device,
 (iii) Introducing a reducing agent containing nitrogen into the catalyst device, and
 (iv) Reducing nitrogen oxides in the catalyst device by means of selective catalytic reduction (SCR).

The method according to the invention is particularly advantageous if the $NO_2$ proportion in the nitrogen oxide exceeds 50% ($NO_2/NO_x>0.5$), thus is for example 75%.

Preferably, the exhaust gases introduced in step (ii) originate from lean-burn engines, in particular from an oxidation catalyst downstream of the engine. The catalyst device according to the invention can be combined in the method in series or in parallel with other devices for purifying exhaust gases, such as other catalysts or filters.

In the SCR reaction, a reducing agent containing nitrogen, preferably ammonia ($NH_3$) or a precursor compound thereof, such as urea, is added. The reducing agent containing nitrogen is preferably added to the exhaust gas before it enters the catalyst device, but it can also be introduced separately into the catalyst device.

The catalyst device according to the invention achieves the object underlying the invention. A catalyst device is provided for the purification of exhaust gases by means of SCR, which efficiently removes nitrogen oxides and thereby prevents the formation of nitrous oxide. The device is suitable for purifying exhaust gases in a wide temperature range, especially at low temperatures. It is particularly suitable for the purification of $NO_2$-rich exhaust gases produced during the operation of diesel engines, for example in conjunction with an oxidation catalyst. The catalyst device shows a high degree of catalytic activity even after aging and prevents or minimizes the formation of nitrous oxide. Due to the high degree of efficiency during the SCR under various application conditions, even at low temperatures and in the case of both low and high $NO_2$ contents, the catalyst devices are highly suitable for applications in the automotive field.

EXEMPLARY EMBODIMENTS

Pre-Tests
FIGS. 1 and 2 show the dependence of the conversion of nitrogen monoxide, see FIG. 1, or nitrogen dioxide ($NO_2/NO_x=75\%$), see FIG. 2, on the cerium content of the SCR catalyst.

In FIGS. 1 and 2:
Reference=SCR catalyst made of 3% $V_2O_5$, 4.3% $WO_3$ and remainder $TiO_2$ with 5% $SiO_2$
1% cerium oxide=as reference, but $TiO_2/SiO_2$ replaced by cerium oxide up to a cerium oxide content of the catalyst of 1%
5% cerium oxide=as reference, but $TiO_2/SiO_2$ replaced by cerium oxide up to a cerium oxide content of the catalyst of 5%
10% cerium oxide=as reference, but $TiO_2/SiO_2$ replaced by cerium oxide up to a cerium oxide content of the catalyst of 10%

The catalysts were coated in the usual way on commercial flow-through substrates with a wash coat load of 160 g/l and with a GHSV=60000 1/h of $NO_x$ conversion measured with the following test gas composition: $NO_x$: 1000 ppm
$NO_2/NO_x$: 0% (FIG. 1) or 75% (FIG. 2)
$NH_3$: 1100 ppm (FIG. 1) or 1350 ppm (FIG. 2)
$O_2$: 10%
$H_2O$: 5%
$N_2$: Remainder As shown in FIG. 1, the conversion of NO deteriorates with increasing cerium oxide content, while as shown in FIG. 2, the conversion at $NO_2/NO_x=75\%$ improves with increasing cerium oxide content.

Example 1: Preparation of Coating Suspensions (Wash Coats)

Preparation of Coating Suspension a (Vanadium SCR)
A commercially available titanium dioxide in anatase form doped with 5% by weight silicon dioxide was dispersed in water. Subsequently, an aqueous solution of ammonium metatungstate and ammonium metavanadate dissolved in oxalic acid were added as a tungsten or vanadium precursor in an amount to result in a catalyst of composition 87.4% by weight $TiO_2$. 4.6% by weight $SiO_2$, 5.0% by weight $WO_3$ and 3.0% by weight $V_2O_5$. The mixture was stirred intensively and finally homogenized in a commercial agitator ball mill and ground to d90<2 µm.
Preparation of Coating Suspension B (Vanadium SCR with 1% Cerium Oxide)
A commercially available titanium dioxide in anatase form doped with 5% by weight silicon dioxide was dispersed in water. Subsequently, an aqueous solution of ammonium metatungstate as tungsten precursor, ammonium metavanadate dissolved in oxalic acid as vanadium precursor and an aqueous solution of cerium acetate as cerium precursor were added in an amount to result in a catalyst of a composition calculated as 86.4% by weight $TiO_2$, 4.6% by weight $SiO_2$, 5.0% by weight $WO_3$, 3.0% by weight $VO_2O_5$ and 1% $CeO_2$. The mixture was stirred intensively and finally homogenized in a commercial agitator ball mill and ground to d90<2 µm.
Preparation of Coating Suspension C (Fe—SCR, SAR=25)
A coating suspension for a commercially available SCR catalyst based on an iron-exchanged beta zeolite was prepared. For this purpose, a commercial $SiO_2$ binder, a commercial boehmite binder (as coating aids), iron(III) nitrate nonahydrate and commercially available beta zeolite with a molar $SiO_2/Al_2O_3$ ratio (SAR) of 25 were suspended in water so that a catalyst of composition 90% by weight of β zeolite and an iron content, calculated as $Fe_2O_3$, of 4.5% by weight results.

Preparation of Coating Suspension D (Fe—SCR, SAR=10)

A coating suspension for a commercially available SCR catalyst based on an iron-exchanged beta zeolite was prepared. For this purpose, a commercial $SiO_2$ binder, a commercial boehmite binder (as coating aids), iron (III) nitrate nonahydrate and commercially available beta zeolite with a molar $SiO_2/Al_2O_3$ ratio (SAR) of 10 were suspended in water so that a catalyst of composition 90% by weight of β zeolite and an iron content, calculated as $Fe_2O_3$, of 4.5% by weight results.

Example 2: Production of Catalyst Devices

Various catalyst devices were produced by coating ceramic substrates with the coating suspensions A to D. Customary ceramic monoliths with parallel flow channels open on both sides were used as substrates. In this case, a first and a second layer (S1, S2) were applied to each substrate, each layer being divided into two adjacent zones (Z1, Z2). The exhaust gases to be purified flow in the direction of flow into the catalyst device, that is over the upper layer 2 and from zone 1 to zone 2. Scheme 1 shows the structure of the catalyst devices with four catalytic regions located in two layers and two zones.

Scheme 1: Schematic structure of the catalyst devices produced in accordance exemplary embodiments
Direction of flow →

| Layer 2 Zone 1 (S2Z1) | Layer 2 Zone 2 (S2Z2) |
| Layer 1 Zone 1 (S1Z1) | Layer 1 Zone 2 (S1Z2) |
| Substrate | |

The compositions and quantities used of coating suspensions A to D are summarized in Table 1 below. The table also shows which catalytic layers S1 and S2 and zones Z1 and Z2 were applied. The catalysts E1 to E5 are according to the invention and V1 to V4 are reference catalysts.

First, one of the dispersions A to D was applied using a conventional immersion process starting from the inlet side over the length of the region Z1S1 of a commercial flow-through substrate with 62 cells per square centimeters, a cell wall thickness of 0.17 millimeters and a length of 76.2 mm. The partially coated component was initially dried at 120° C. Subsequently, using the same method, one of the dispersions A to D was applied, starting from the outlet side, to the length of the region Z2S1. The coated component was then dried at 120° C., for 15 minutes at 350° C., then calcined at 600° C. for a duration of 3 hours. If the dispersion and wash coat loading were identical in the Z1S1 and Z2S1 regions, one of the dispersions A-D was applied to a commercial flow-through substrate with 62 cells per square centimeters and a cell wall thickness of 0.17 millimeters over its total length of 76.2 mm using a conventional immersion process. It was then dried at 120° C., for 15 minutes at 350° C., then calcined at 600° C. for a duration of 3 hours.

The component calcined in this manner was subsequently coated with one of the suspensions A to D from the inlet side over the length of the region Z1 S2 using the process described above, and dried at 120° C. The previously described step was skipped if no coating was planned for the region Z1 S2. Subsequently, the coating was applied over the length of the region Z2S2 with one of the suspensions A to D starting from the outlet side. Drying then took place at 120° C. The previously described step was skipped if no coating was planned for the region Z2S2. Subsequently, calcination was carried out at 350° C. for 15 minutes, then at 600° C. for a duration of 3 hours. If the dispersion and wash coat loading were identical in the Z1S2 and Z2S2 regions, one of the dispersions A to D was applied to the entire length of the component of 76.2 mm using the process described above. It was then dried at 120° C., for 15 minutes at 350° C., then calcined at 600° C. for a duration of 3 hours.

TABLE 1

Production of the catalyst devices with coating suspensions A to D in the first and second layer (S1, S2) and the first and second zone (Z1, Z2). Respectively indicated are the total quantity in each of the four regions (S1Z1 to S2Z2) in g/l after drying, calcination and tempering, and the length of the zones in % based on the total length of the catalyst device. The catalysts V1 to V4 are reference catalysts.

| | Metal | | Coating suspension | |
| --- | --- | --- | --- | --- |
| No. | Z1S2 Z1S1 | Z2S2 Z2S1 | Z1S2 Z1S1 | Z2S2 Z2S1 |
| V1 | Fe | V | 65 g/l D, L = 33% | 140 g/l A, L = 67% |
| | Fe | V | 65 g/l D, L = 33% | 140 g/l A, L = 67% |
| E1 | Fe | V—Ce | 110 g/l C, L = 33% | 160 g/l B, L = 67% |
| | Fe | V—Ce | 110 g/l C, L = 33% | 180 g/l B, L = 67% |
| E2 | V—Ce | V—Ce | 280 g/l B, L = 50% | 280 g/l B, L = 50% |
| | Fe | Fe | 50 g/l C, L = 50% | 50 g/l C, L = 50% |
| V2 | V | V | 280 g/l A, L = 50% | 280 g/l A, L = 50% |
| | Fe | Fe | 50 g/l C, L = 50% | 50 g/l C, L = 50% |
| V3 | V | Fe | 140 g/l A, L = 50% | 110 g/l D, L = 33% |
| | V | Fe | 140 g/l A, L = 50% | 110 g/l D, L = 33% |
| V4 | V | Fe | 140 g/l A, L = 50% | 65 g/l D, L = 33% |
| | V | Fe | 140 g/l A, L = 50% | 65 g/l D, L = 33% |
| E3 | V—Ce | Fe | 180 g/l B, L = 67% | 110 g/l C, L = 33% |
| | V—Ce | Fe | 180 g/l B, L = 67% | 110 g/l C, L = 33% |
| E4 | V—Ce | Fe | 160 g/l B, L = 67% | 110 g/l C, L = 33% |
| | V | Fe | 200 g/l A, L = 67% | 110 g/l C, L = 33% |
| E5 | V—Ce | V | 180 g/l B, L = 67% | 280 g/l A, L = 33% |
| | V—Ce | Fe | 180 g/l B, L = 67% | 100 g/l C, L = 33% |

As an alternative to the process described above, it would also be possible to produce two catalysts (Z1, Z2) corresponding to the zones Z1 and Z2 described above and to test both catalysts one after the other (Z1 before Z2).

Catalyst Z1:

Initially, apply one of the dispersions A to D over the entire length of the substrate with length Z1 (region Z1S1), dry at 120° C., then at 350° C. for 15 minutes, subsequently calcine at 600° C. for a duration of 3 hours. If intended, subsequently apply one of the dispersions A to D over the entire length of the component thus obtained (region Z1S2), then at 350° C. for 15 minutes, subsequently calcine at 600° C. for a duration of 3 hours.

Catalyst Z2:

Initially, apply one of the dispersions A to D over the entire length of the substrate with length Z2 (region Z2S1), dry at 120° C., then at 350° C. for 15 minutes, subsequently calcine at 600° C. for a duration of 3 hours. If intended, subsequently apply one of the dispersions A to D over the entire length of the component thus obtained (region Z2S2), then at 350° C. for 15 minutes, subsequently calcine at 600° C. for a duration of 3 hours.

Example 3: Reduction of Nitrogen Oxides by Means of SCR

Measurement Method

The catalyst devices produced according to Example 2 were tested for their activity and selectivity in the selective catalytic reduction of nitrogen oxides. In doing so, the nitrogen oxide conversion was measured at various defined temperatures (measured on the inlet side of the catalyst) as a measure of the SCR activity and the formation of nitrous oxide. On the inlet side, model exhaust gases containing preset proportions of NO, $NH_3$, $NO_2$ and $O_2$, among other things, were introduced. The nitrogen oxide conversions were measured in a quartz glass reactor. For this purpose, drill cores with L=3" and D=1" were tested between 190 and 550° C. under stationary conditions. The measurements were carried out under the test conditions summarized below. GHSV is the gas hourly space velocity (gas flow rate: catalyst volume). The conditions of the measurement series TP1 to TP4 are summarized below:

Test Parameter Set TP1:

Gas hourly space velocity GHSV=60000 1/h with the following synthesis gas composition:
1000 vppm NO, 1100 vppm $NH_3$, 0 vppm $N_2O$
$a=xNH_3/xNO_x=1.1$
$xNO_x=xNO+xNO_2+xN_2O$, where x in each case means concentration (vppm)
10% by vol. $O_2$, 5% by vol. $H_2O$, remainder $N_2$.

Test Parameter Set TP2
GHSV=60000 1/h with the following synthesis gas composition:
250 vppm NO, 750 vppm $NO_2$, 1350 vppm $NH_3$, 0 vppm $N_2O$
$a=xNH_3/xNO_x=1.35$
$xNO_x=xNO+xNO_2+xN_2O$, where x in each case means concentration (vppm)
10% by vol. $O_2$, 5% by vol. $H_2O$, remainder $N_2$.

Test Parameter Set TP3
GHSV=30000 1/h with the following synthesis gas composition:
500 vppm NO, 550 vppm $NH_3$, 0 vppm $N_2O$
$a=xNH_3/xNO_x=1.1$
$xNO_x=xNO+xNO_2+xN_2O$, where x in each case means concentration (ppm)
10% by vol. $O_2$, 5% by vol. $H_2O$, remainder $N_2$.

Test Parameter Set TP4
GHSV=30000 1/h with the following synthesis gas composition.
125 vppm NO, 375 vppm $NO_2$, 675 vppm NH3, 0 vppm $N_2O$
$a=xNH3/xNO=1.35$
$xNO_x=xNO+xNO_2+xN_2O$, where x in each case means concentration (ppm) 10% by vol. $O_2$, 5% by vol. $H_2O$, remainder $N_2$.

The nitrogen oxide concentrations (nitrogen monoxide, nitrogen dioxide, nitrous oxide) after the catalyst device were measured. The nitrogen oxide conversion via the catalyst device for each temperature measuring point was calculated as follows (x is the concentration in vppm in each case) from the nitrogen oxide contents which were adjusted in the model exhaust gas and which were verified with a pre-catalyst exhaust gas analysis during conditioning at the start of the respective test run, and the measured nitrogen oxide contents after the catalyst device:

$U_{NOx}[\%]=(1-x_{Output}(NO_x)/x_{Input}(NO_x))*100[\%]$ with $x_{Input}(NO_x)=x_{input}(NO)+x_{Input}(NO_2)$
$x_{Output}(NO_x)=x_{Output}(NO)+x_{Output}(NO_2)+2*x_{Output}(N_2O)$.

$x_{Output}(N_2O)$ was weighted with a factor of 2 in order to take stoichiometry into account.

In order to determine the way in which the aging of the catalysts affects the result, the catalyst devices were subjected to hydrothermal aging for 100 hours at 580° C. in a gas atmosphere (10% $O_2$, 10% $H_2O$, remainder $N_2$). Subsequently, the conversions of nitrogen oxides were determined according to the method described above.

Results

The results of the measurement series TP1 and TP3, with which the model exhaust gas contained exclusively NO as nitrogen oxide, are summarized in Table 2. The results of the measurement series TP2 and TP4, in which the model exhaust gas contained NO and $NO_2$ as nitrogen oxides in a ratio of 1:3, are summarized in Table 3. The tables indicate which catalyst was used according to example 2 (Table 1). For each defined temperature value, the percentage of the initial concentration $NO_x$ removed is indicated. Table 3 also indicates, for each temperature value 2 to 7, the absolute quantity of $N_2O$ measured after the catalyst at each temperature value. Tables 4 and 5 summarize the conditions and results of the catalyst device tests after aging.

The tests show that the SCR catalysts according to the invention with two catalytic regions, the first region containing a vanadium oxide and a cerium oxide and the second region containing a molecular sieve containing iron, achieve a high degree of efficiency in the reductive removal of nitrogen oxides ($NO_x$) by means of SCR. They are suitable not only for the reaction with NO-rich exhaust gases but also for the treatment of $NO_2$-rich exhaust gases. The reduction of nitrogen oxides from $NO_2$-rich exhaust gases is especially efficient in the temperature range below 400° C. or below 350° C. In addition, the formation of nitrous oxide can be suppressed in the SCR with catalysts according to the invention. For example, the catalysts E3, E4 and E5 eliminate nitrogen oxides $NO_x$ almost completely both in NO-rich exhaust gases (Table 2) and in $NO_2$-rich exhaust gases (Table 3), with the formation of nitrous oxide almost completely suppressed. Catalyst E2 also efficiently removes nitrogen oxides $NO_x$ from both NO- and $NO_2$-rich exhaust gases and reduces the amount of nitrous oxide produced. The advantages of catalyst E2 after aging are particularly pronounced (Tables 4, 5), which is particularly important for practical applications in connection with combustion engines. The E1 catalyst also shows a high degree of efficiency with reduced nitrous oxide formation. The catalyst devices according to the invention thus combine several advantageous properties, specifically a high degree of efficiency with $NO_2$-rich exhaust gases in the temperature range from approximately 180° C. to 500° C., and especially at low temperatures, a high degree of efficiency with NO-rich exhaust gases, and the avoidance of nitrous oxide formation. The effects can be seen with freshly produced catalysts and after an aging process.

TABLE 2

Conditions and results of the reduction of NO with different catalyst devices (tests TP1 and TP3) at different actually measured temperatures 1 to 8. The depletion of NO$_x$ at the catalyst device outlet is indicated as a percentage of the initial amount used.

| Cat. no. | Test TP | Temperature [° C.] | | | | | | | | NO$_x$ [%] | | | | | | | |
|---|---|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 | 7 | 8 |
| V1 | 1 | 535 | 489 | 442 | 394 | 344 | 295 | 246 | 197 | 88% | 95% | 98% | 98% | 97% | 93% | 73% | 31% |
| E1 | 3 | 539 | 494 | 447 | 399 | 350 | 300 | 251 | 202 | 93% | 97% | 98% | 97% | 94% | 92% | 92% | 74% |
| V2 | 1 | 543 | 496 | 448 | 400 | 350 | 300 | 251 | 201 | 65% | 92% | 99% | 100% | 100% | 98% | 86% | 42% |
| E2 | 1 | 537 | 490 | 443 | 395 | 346 | 296 | 247 | 198 | 78% | 94% | 98% | 99% | 98% | 94% | 76% | 34% |
| V3 | 1 | 537 | 490 | 443 | 394 | 345 | 295 | 246 | 197 | 72% | 96% | 99% | 100% | 99% | 96% | 80% | 40% |
| V4 | 1 | 535 | 489 | 442 | 394 | 344 | 295 | 246 | 197 | 73% | 96% | 99% | 100% | 99% | 95% | 77% | 35% |
| E3 | 3 | 539 | 494 | 447 | 400 | 350 | 301 | 251 | 202 | 70% | 92% | 100% | 100% | 100% | 100% | 100% | 74% |
| E4 | 3 | 539 | 494 | 448 | 400 | 350 | 301 | 251 | 202 | 71% | 92% | 100% | 100% | 100% | 100% | 100% | 73% |
| E5 | 3 | 539 | 494 | 447 | 400 | 350 | 301 | 251 | 202 | 68% | 92% | 100% | 100% | 100% | 100% | 99% | 76% |

TABLE 3

Test conditions and results of the reduction of NO$_2$:NO in the ratio 3:1 (tests TP2 and TP4) at different actually measured temperatures. For measurements 2 to 7, the depletion of NO$_x$ at the catalyst device outlet as a percentage of the initial amount used and the measured values for N$_2$O at the catalyst device outlet in ppm are indicated.

| Cat. | Test TP | Temperature [° C.] | | | | | | NO$_x$ [%] | | | | | | Quantity of N$_2$O [ppm] | | | | | |
|---|---|---|---|---|---|---|---|---|---|---|---|---|---|---|---|---|---|---|---|
| | | 2 | 3 | 4 | 5 | 6 | 7 | 2 | 3 | 4 | 5 | 6 | 7 | 2 | 3 | 4 | 5 | 6 | 7 |
| V1 | 2 | 489 | 441 | 392 | 343 | 293 | 244 | 97% | 95% | 89% | 80% | 65% | 62% | 12 | 27 | 56 | 83 | 98 | 56 |
| E1 | 4 | 495 | 448 | 400 | 350 | 301 | 251 | 98% | 98% | 95% | 92% | 89% | 83% | 3 | 11 | 26 | 39 | 48 | 48 |
| V2 | 2 | 496 | 447 | 399 | 349 | 300 | 250 | 97% | 99% | 97% | 83% | 65% | 53% | 14 | 7 | 13 | 50 | 96 | 78 |
| E2 | 2 | 490 | 442 | 394 | 344 | 295 | 246 | 96% | 97% | 95% | 90% | 78% | 62% | 14 | 17 | 26 | 38 | 69 | 76 |
| V3 | 2 | 490 | 442 | 393 | 343 | 294 | 245 | 97% | 98% | 98% | 85% | 68% | 65% | 14 | 9 | 10 | 48 | 97 | 72 |
| V4 | 2 | 489 | 441 | 392 | 343 | 293 | 244 | 97% | 98% | 98% | 83% | 66% | 65% | 14 | 9 | 10 | 53 | 100 | 60 |
| E3 | 4 | 495 | 448 | 400 | 351 | 301 | 251 | 96% | 99% | 99% | 99% | 8% | 84% | 15 | 7 | 6 | 4 | 9 | 37 |
| E4 | 4 | 495 | 448 | 400 | 351 | 301 | 251 | 96% | 99% | 99% | 99% | 8% | 84% | 14 | 7 | 6 | 4 | 10 | 37 |
| E5 | 4 | 495 | 448 | 400 | 351 | 301 | 261 | 94% | 98% | 99% | 99% | 5% | 76% | 19 | 11 | 7 | 4 | 8 | 22 |

TABLE 4

Conditions and results of the reduction of NO with different catalyst devices after aging (tests TP1) at different actually measured temperatures 1 to 8. The depletion of NO$_x$ at the catalyst device outlet is indicated as a percentage of the initial amount used.

| Test No. | TP | Temperature [° C.] | | | | | | | | NO$_x$ | | | | | | | |
|---|---|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 | 7 | 8 |
| E2 | 1 | 543 | 495 | 447 | 398 | 348 | 299 | 249 | 199 | 70% | 93% | 97% | 98% | 97% | 93% | 71% | 28% |
| V2 | 1 | 542 | 496 | 448 | 400 | 350 | 300 | 250 | 201 | 68% | 93% | 99% | 100% | 100% | 97% | 77% | 31% |

TABLE 5

Test conditions and results of the reduction of NO$_2$:NO in the ratio 3:1 (test TP2) with different catalyst devices after aging at different actually measured temperatures. For measurements 2 to 7, the depletion of NO$_x$ at the catalyst device outlet as a percentage of the initial amount used and the measured values for N$_2$O in ppm at the catalyst device outlet are indicated.

| Test No. | TP | Temperature [° C.] | | | | | | NO$_x$ [%] | | | | | | Quantity of N$_2$O [ppm] | | | | | |
|---|---|---|---|---|---|---|---|---|---|---|---|---|---|---|---|---|---|---|---|
| | | 2 | 3 | 4 | 5 | 6 | 7 | 2 | 3 | 4 | 5 | 6 | 7 | 2 | 3 | 4 | 5 | 6 | 7 |
| E2 | 2 | 495 | 447 | 398 | 348 | 298 | 249 | 92% | 95% | 95% | 92% | 77% | 60% | 28 | 20 | 19 | 28 | 60 | 74 |
| V2 | 2 | 495 | 447 | 398 | 349 | 300 | 250 | 92% | 96% | 97% | 81% | 61% | 56% | 34 | 20 | 16 | 42 | 83 | 76 |

The invention claimed is:

1. A catalyst device for purifying exhaust gases containing nitrogen oxide by means of selective catalytic reduction (SCR), comprising at least two catalytic regions, the first region comprises the following components:
   (a) from 0.5 to 10% by weight vanadium oxide, calculated as $V_2O_5$,
   (b) from 0.2 to 10% by weight cerium oxide, calculated as $CeO_2$,
   (c) from 0 to 17% by weight tungsten oxide, calculated as $WO_3$,
   (d) from 25 to 98% by weight titanium oxide, calculated as $TiO_2$,
   (e) from 0 to 15% by weight silicon oxide, calculated as $SiO_2$,
   (f) from 0 to 15% by weight aluminum oxide, calculated as $Al_2O_3$
   and in each case based on the weight of the first region, and
   the second region containing a molecular sieve containing iron.

2. The catalyst device according to claim 1, wherein the first region contains, in addition to said components (a), (b) and (d), a quantity of at least one of (c), (e) and (f).

3. The catalyst device according to claim 1, wherein the first region comprises from 0.5 to 5% by weight of cerium oxide, calculated as $CeO_2$, and 1 to 5% by weight vanadium oxide, calculated as $V_2O_5$, each based on the weight of the first region.

4. The catalyst device according to claim 1, wherein the first region comprises from 0.5 to 7% by weight of cerium oxide, calculated as $CeO_2$ and based on the weight of the first region.

5. The catalyst device according to claim 1, wherein the first region comprises from 0.5 to 3% by weight of cerium oxide, calculated as $CeO_2$ and based on the weight of the first region.

6. The catalyst device according to claim 1, wherein the molecular sieve is a zeolite.

7. The catalyst device according to claim 6, wherein the zeolite is an iron-exchanged zeolite that preferably has a structure whose maximum ring size has more than 8 tetrahedra.

8. The catalyst device of claim 6, wherein the zeolite has a structure selected from AEL, AFI, AFO, AFR, ATO, BEA, GME, HEU, MFI, MWW, EUO, FAU, FER, LTL, MAZ, MOR, MEL, MTW, OFF and TON.

9. The catalyst device according to claim 1, which is designed in such a manner that the exhaust gases initially contact the first region.

10. The catalyst device according to claim 9, wherein the first and second region form adjacent zones, wherein the first region is a first zone and the second region is a second zone, wherein the first zone is upstream of the second zone in the direction of flow of the exhaust gas.

11. The catalyst device according to claim 10, wherein the first zone comprises a first pair of superimposed layers and the second zone comprises a second pair of superimposed layers.

12. The catalyst device according to claim 9, wherein the first and second region form superimposed layers, wherein the first region is the top layer.

13. The catalyst device according to claim 1, wherein the first and second region are applied onto an inert substrate that is preferably a ceramic monolith.

14. A device, comprising:
   the catalyst device according to claim 1 and an upstream device releasing exhaust gases.

15. The catalyst device according to claim 1, wherein the first region and the second region form adjacent zones, wherein the first region is a first zone and the second region is a second zone, wherein the first zone is downstream of the second zone in the direction of flow of the exhaust gas.

16. The catalyst device according to claim 1, wherein the first region and the second region form superimposed layers, wherein the second region is the top layer relative to the first region.

17. A method of selective catalytic reduction (SCR), comprising utilizing catalyst device according to claim 1 for purifying exhaust gases containing nitrogen oxide by means of selective catalytic reduction (SCR).

18. The method according to claim 17 wherein the method includes avoiding the formation of nitrous oxide.

19. The method according to claim 17, wherein the exhaust gases have an $NO_2/NO_x$ ratio of $>0.5$ and/or a temperature of 180° C. to 450° C.

20. A method for purifying exhaust gases, comprising the steps of:
   (i) providing a catalyst device or a system according to claim 1,
   (ii) introducing exhaust gases containing nitrogen oxides into the catalyst device,
   (iii) introducing a reducing agent containing nitrogen into the catalyst device, and
   (iv) reducing nitrogen oxides in the catalyst device by means of selective catalytic reduction (SCR).

* * * * *